US010250714B2

(12) United States Patent
Shao et al.

(10) Patent No.: US 10,250,714 B2
(45) Date of Patent: Apr. 2, 2019

(54) PAGE REDIRECTION METHOD, ROUTING DEVICE, TERMINAL DEVICE AND SYSTEM

(71) Applicant: Huawei Device Co., Ltd., Dongguan (CN)

(72) Inventors: Lei Shao, Xi'an (CN); Xuting Wang, Xi'an (CN); Mingdong Song, Xi'an (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 227 days.

(21) Appl. No.: 14/902,489

(22) PCT Filed: Sep. 2, 2014

(86) PCT No.: PCT/CN2014/085777
§ 371 (c)(1),
(2) Date: Dec. 31, 2015

(87) PCT Pub. No.: WO2015/039559
PCT Pub. Date: Mar. 26, 2015

(65) Prior Publication Data
US 2016/0182681 A1    Jun. 23, 2016

(30) Foreign Application Priority Data
Sep. 18, 2013    (CN) .......................... 2013 1 0431768

(51) Int. Cl.
*G06F 15/16*        (2006.01)
*H04L 29/08*        (2006.01)

(52) U.S. Cl.
CPC ............ *H04L 67/327* (2013.01); *H04L 67/02* (2013.01); *H04L 67/2814* (2013.01); *H04L 67/34* (2013.01)

(58) Field of Classification Search
CPC ... H04L 67/327; H04L 67/02; H04L 67/2814; H04L 67/34
(Continued)

(56) References Cited

U.S. PATENT DOCUMENTS 6,992,983 B1    1/2006 Chatterjee
2006/0031404 A1    2/2006 Kassab
(Continued)

FOREIGN PATENT DOCUMENTS

CN    1416090 A    5/2003
CN    1538706 A    10/2004
(Continued)

*Primary Examiner* — Liang Che A Wang
*Assistant Examiner* — Kaylee J Huang
(74) *Attorney, Agent, or Firm* — Slater Matsil, LLP

(57) ABSTRACT

A page redirection method, a routing device, a terminal device and a system. The routing device receives based on a first access request sent a first access response fed back by a network server; according to a redirection determination indication, modifies a return code of the first access response and adding at least one second access address of a redirected-to page and the first access address to the first access response; and sends the first access response on which redirection processing is performed to the terminal device, so that the terminal device sends a second access request according to the modified return code, and the terminal device opens, according to a second access response returned for the second access request, the page that a user needs to access and the redirected-to page.

17 Claims, 7 Drawing Sheets

(58) Field of Classification Search
USPC ........ 709/217, 218, 219, 238, 239, 246, 205
See application file for complete search history.

(56) References Cited

U.S. PATENT DOCUMENTS

| | | | |
|---|---|---|---|
| 2007/0180147 A1* | 8/2007 | Leigh | G06Q 30/02 709/246 |
| 2009/0234965 A1 | 9/2009 | Viveganandhan et al. | |
| 2010/0037138 A1* | 2/2010 | Shcherbakov | G06F 17/30781 715/716 |
| 2012/0023090 A1* | 1/2012 | Holloway | H04L 67/28 707/709 |
| 2013/0139221 A1* | 5/2013 | Gundavelli | H04W 12/06 726/4 |
| 2013/0268525 A1* | 10/2013 | Kanai | G06Q 30/02 707/723 |

FOREIGN PATENT DOCUMENTS

| | | |
|---|---|---|
| CN | 101217568 A | 7/2008 |
| CN | 101741769 A | 6/2010 |
| CN | 101854375 A | 10/2010 |
| CN | 101971597 A | 2/2011 |
| JP | 2009031852 A | 2/2009 |
| JP | 2013034069 A | 2/2013 |
| WO | 0219183 A2 | 3/2002 |

\* cited by examiner

PAGE REDIRECTION METHOD, ROUTING DEVICE, TERMINAL DEVICE AND SYSTEM

This application is National Stage of International Application No. PCT/CN2014/085777 filed on 2 Sep. 2014, which claims priority to Chinese Patent Application No. CN 201310431768.X, filed with the Chinese Patent Office on Sep. 18, 2013, which are incorporated herein by reference in its entirety.

TECHNICAL FIELD

Embodiments of the present invention relate to communications technologies, and in particular, to a page redirection method, a routing device, a terminal device and a system.

BACKGROUND

With the rapid development of Internet technologies, to meet a requirement for multiple user terminal devices in a home or a local area network, more and more user terminal devices access a network by using a routing device.

Generally, the routing device needs to have a function of captive portal redirection when the routing device is used. For example, when an application of the routing device needs to be updated and the terminal device accesses a portal page of the routing device, an update prompt instructs the routing device to performs destination network address translation (DNAT for short) on a destination address or a port of an opened page of a user browser by means of browser redirection, so as to redirect a page that is being accessed by a user to an update page for the routing device, thereby reminding the user to update and maintain the routing device.

In the prior art, when the routing device updates its configuration by redirecting the user browser, a page that the user needs to access is redirected to the update page for the routing device, causing that the page that the user needs to access cannot be normally opened and can be accessed only after a browser window is opened again and an address of the page is entered, which brings a lot of unnecessary trouble when the user browses a web page.

SUMMARY

Embodiments of the present invention provide a page redirection method, a routing device, a terminal device and a system so as to solve a problem that a page that a user needs to access can not be normally opened.

According to a first aspect, a page redirection method is provided, including: receiving, based on a first access request sent by a terminal device, a first access response that is corresponding to the first access request and is fed back by a network server, where the first access request includes a first access address of a page that a user needs to access; according to a redirection determination indication, modifying a return code of the first access response and adding at least one second access address of a redirected-to page and the first access address to the first access response; and sending the first access response on which redirection processing is performed to the terminal device, so that the terminal device sends a second access request according to the modified return code, and the terminal device opens, according to a second access response returned for the second access request, the page that the user needs to access and the redirected-to page.

In a first possible implementation manner of the first aspect, before the receiving a first access response that is corresponding to the first access request and is fed back by a network server, the method further includes: receiving the first access request sent by the terminal device; acquiring and storing the first access address in the first access request according to the redirection determination indication; and sending the first access request to the network server corresponding to the first access address.

According to the first possible implementation manner of the first aspect, in a second possible implementation manner, before the acquiring and storing the first access address in the first access request according to the redirection determination indication, the method further includes: determining to perform redirection processing on the first access request according to a redirection processing rule, where the redirection processing rule includes: when a version update message notified by a network server is detected, setting an access address of the redirected-to page to an access address, in the version update message, of a prompt page; or when a new short message is detected, setting an access address of the redirected-to page to an access address that is of a prompt page and is notified in the new short message.

According to the second possible implementation manner of the first aspect, in a third possible implementation manner, the redirection processing rule further includes: canceling the redirection processing rule after performing redirection once.

According to the first aspect and any one of the first to the third possible implementation manners of the first aspect, in a fourth possible implementation manner, after the sending the first access response on which redirection processing is performed to the terminal device, so that the terminal device sends a second access request according to the modified return code, the method further includes: receiving the second access request that includes the first access address and the at least one second access address and is sent by the terminal device according to the modified return code; sending the second access request to a network server corresponding to the first access address and the at least one second access address; receiving the second access response that is corresponding to the second access request and is fed back by the network server, where the second access response includes an access response corresponding to the first access address and an access response corresponding to the at least one second access address; and sending the second access response to the terminal device, so that the terminal device opens, according to the second access response, the page that the user needs to access and the redirected-to page.

According to a second aspect, a page redirection method is provided, including: receiving, based on a first access request sent to a routing device, a first access response on which redirection processing is performed and that is sent by the routing device, where the first access request includes a first access address of a page that a user needs to access, and the first access response includes a return code modified by the routing device and at least one second access address of a redirected-to page and the first access address that are added by the routing device; and opening, based on the first access response on which redirection processing is performed by the routing device, the page that the user needs to access and the redirected-to page.

In a first possible implementation manner of the second aspect, before the receiving a first access response on which redirection processing is performed and that is sent by the routing device, the method further includes: sending the first access request to the routing device, so that the routing device acquires and stores the first access address in the first access request, and the routing device sends the first access request to a network server corresponding to the first access address.

According to the first possible implementation manner of the second aspect, in a second possible implementation manner, before the opening, based on the first access response on which redirection processing is performed by the routing device, the page that the user needs to access and the redirected-to page, the method further includes: sending a second access request according to the modified return code, where the second access request includes the first access address and the at least one second access address; and receiving a second access response that is corresponding to the second access request and is returned by the routing device, where the second access response includes an access response corresponding to the first access address and an access response corresponding to the at least one second access address; and the opening, based on the first access response on which redirection processing is performed by the routing device, the page that the user needs to access and the redirected-to page includes: according to the second access response, displaying the page that the user needs to access in a first display window that is already opened when the first access request is sent to the routing device, and opening a second window to display the redirected-to page.

According to a third aspect, a routing device is provided, including: a receiving control module, configured to receive, based on a first access request sent by a terminal device and by controlling a receiver, a first access response that is corresponding to the first access request and is fed back by a network server, where the first access request includes a first access address of a page that a user needs to access. A processing module is configured to: according to a redirection determination indication, modify a return code of the first access response received by the receiving control module and add at least one second access address of a redirected-to page and the first access address to the first access response. A sending control module is configured to send, by controlling a transmitter, the first access response on which redirection processing is performed by the processing module to the terminal device, so that the terminal device sends a second access request according to the modified return code, and the terminal device opens, according to a second access response returned for the second access request, the page that the user needs to access and the redirected-to page.

In a first possible implementation manner of the third aspect, the receiving control module is further configured to: before receiving, by controlling the receiver, the first access response that is corresponding to the first access request and is fed back by the network server, receive, by controlling the receiver, the first access request sent by the terminal device; the routing device further includes: a storage module, configured to acquire and store the first access address in the first access request according to the redirection determination indication; and the sending control module is further configured to send, by controlling the transmitter, the first access request to the network server corresponding to the first access address.

According to the first possible implementation manner of the third aspect, in a second possible implementation manner, the routing device further includes: a determining module, which is configured to: before the storage module acquires and stores the first access address in the first access request according to the redirection determination indication, determine to perform redirection processing on the first access request according to a redirection processing rule, where the redirection processing rule includes: when a version update message notified by a server is detected, setting an access address of the redirected-to page to an access address, in the version update message, of a prompt page; or when a new short message is detected, setting an access address of the redirected-to page to an access address that is of a prompt page and is notified in the new short message.

According to the second possible implementation manner of the third aspect, in a third possible implementation manner, the determining module is further configured to cancel the redirection processing rule after performing redirection once.

According to the third aspect and any one of the first to the third possible implementation manners of the third aspect, in a fourth possible implementation manner, the receiving control module is further configured to: after the sending control module sends, by controlling the transmitter, the first access response on which redirection processing is performed by the processing module to the terminal device so that the terminal device sends the second access request according to the modified return code, receive, by controlling the receiver, the second access request that includes the first access address and the at least one second access address and is sent by the terminal device according to the modified return code; the sending control module is further configured to send, by controlling the transmitter, the second access request received by the receiving control module to a network server corresponding to the first access address and the at least one second access address; the receiving control module is further configured to receive, by controlling the receiver, the second access response that is corresponding to the second access request and is fed back by the network server, where the second access response includes an access response corresponding to the first access address and an access response corresponding to the at least one second access address; and the sending control module is further configured to send, by controlling the transmitter, the second access response received by the receiving control module to the terminal device, so that the terminal device opens, according to the second access response, the page that the user needs to access and the redirected-to page.

According to a fourth aspect, a terminal device is provided, including: a terminal receiving control module, configured to receive, based on a first access request sent to a routing device and by controlling a terminal receiver, a first access response on which redirection processing is performed and that is sent by the routing device, where the first access request includes a first access address of a page that a user needs to access, and the first access response includes a return code modified by the routing device and at least one second access address of a redirected-to page and the first access address that are added by the routing device, and a terminal processing module, configured to open, based on the first access response on which redirection processing is performed by the routing device, the page that the user needs to access and the redirected-to page.

In a first possible implementation manner of the fourth aspect, the terminal device further includes: a terminal sending control module, configured to: before the terminal receiving control module receives the first access response on which redirection processing is performed and that is sent by the routing device, send the first access request to the routing device by controlling a terminal transmitter, so that the routing device acquires and stores the first access address in the first access request, and the routing device sends the first access request to a network server corresponding to the first access address.

According to the first possible implementation manner of the fourth aspect, in a second possible implementation manner, the terminal sending control module is further configured to: before the terminal processing module opens the page that the user needs to access and the redirected-to page, send a second access request according to the modified return code by controlling the terminal transmitter, where the second access request includes the first access address and the at least one second access address; the terminal receiving control module is further configured to receive, by controlling the terminal receiver, a second access response that is corresponding to the second access request and is returned by the routing device, where the second access response includes an access response corresponding to the first access address and an access response corresponding to the at least one second access address; and the terminal processing module is specifically configured to: according to the second access response received by the terminal receiving control module, display the page that the user needs to access in a first display window that is already opened when the first access request is sent to the routing device, and open a second window to display the redirected-to page.

According to a fifth aspect, a routing device is provided, including: a receiver, configured to receive, based on a first access request sent by a terminal device, a first access response that is corresponding to the first access request and is fed back by a network server, where the first access request includes a first access address of a page that a user needs to access; a processor, configured to: according to a redirection determination indication, modify a return code of the first access response received by the receiver and add at least one second access address of a redirected-to page and the first access address to the first access response; and a transmitter, configured to send the first access response on which redirection processing is performed by the processor to the terminal device, so that the terminal device sends a second access request according to the modified return code, and the terminal device opens, according to a second access response returned for the second access request, the page that the user needs to access and the redirected-to page.

In a first possible implementation manner of the fifth aspect, the receiver is further configured to: before the receiving a first access response that is corresponding to the first access request and is fed back by a network server, receive the first access request sent by the terminal device; the processor is further configured to acquire and store the first access address in the first access request according to the redirection determination indication; and the transmitter is further configured to send the first access request to the network server corresponding to the first access address.

According to the first possible implementation manner of the fifth aspect, in a second possible implementation manner, the processor is further configured to: before the acquiring and storing the first access address in the first access request, determine to perform redirection processing on the first access request according to a redirection processing rule, where the redirection processing rule includes: when a version update message notified by a server is detected, setting an access address of the redirected-to page to an access address, in the version update message, of a prompt page; or when a new short message is detected, setting an access address of the redirected-to page to an access address that is of a prompt page and is notified in the new short message.

According to the second possible implementation manner of the fifth aspect, in a third possible implementation manner, the processor is further configured to cancel the redirection processing rule after performing redirection once.

According to the fifth aspect and any one of the first to the third possible implementation manners of the fifth aspect, in a fourth possible implementation manner, the receiver is further configured to: after the transmitter sends the first access response on which redirection processing is performed by the processor to the terminal device so that the terminal device sends the second access request according to the modified return code, receive the second access request that includes the first access address and the at least one second access address and is sent by the terminal device according to the modified return code; the transmitter is further configured to send the second access request received by the receiver to a network server corresponding to the first access address and the at least one second access address; the receiver is further configured to receive the second access response that is corresponding to the second access request and is fed back by the network server, where the second access response includes an access response corresponding to the first access address and an access response corresponding to the at least one second access address; and the transmitter is further configured to send the second access response received by the receiver to the terminal device, so that the terminal device opens, according to the second access response, the page that the user needs to access and the redirected-to page.

According to a sixth aspect, a terminal device is provided, including: a terminal receiver, configured to receive, based on a first access request sent to a routing device, a first access response on which redirection processing is performed and that is sent by the routing device, where the first access request includes a first access address of a page that a user needs to access, and the first access response includes a return code modified by the routing device and at least one second access address of a redirected-to page and the first access address that are added by the routing device; and a terminal processor, configured to open, based on the first access response on which redirection processing is performed by the routing device, the page that the user needs to access and the redirected-to page.

In a first possible implementation manner of the sixth aspect, including: a terminal transmitter, configured to: before the terminal receiver receives the first access response on which redirection processing is performed and that is sent by the routing device, send the first access request to the routing device, so that the routing device acquires and stores the first access address in the first access request, and the routing device sends the first access request to a network server corresponding to the first access address.

According to the first possible implementation manner of the sixth aspect, in a second possible implementation manner, the terminal transmitter is further configured to: before the terminal processor opens the page that the user needs to access and the redirected-to page, send a second access request according to the modified return code, where the second access request includes the first access address and the at least one second access address; the terminal receiver is further configured to receive a second access response that is corresponding to the second access request and is returned by the routing device, where the second access response includes an access response corresponding to the first access address and an access response corresponding to the at least one second access address; and the terminal processor is specifically configured to: according to the second access response received by the terminal receiver, display the page that the user needs to access in a first display window that is opened when the first access request is sent to the routing device, and open a second window to display the redirected-to page.

According to a seventh aspect, a system is provided, including: the routing device in the third aspect and any one of the first to the fourth possible implementation manners of the third aspect; and the terminal device in the fourth aspect and any one of the first, the second possible implementation manners of the fourth aspect.

According to the page redirection method, the routing device, the terminal device and the system that are provided in the embodiments of the present invention, when receiving an access response corresponding to an access request sent by a terminal device, according to a redirection determination indication, a routing device modifies a return code of the access response and adds, to the access response, at least one second access address of a redirected-to page used for the routing device to complete corresponding configuration and a first access address included in the access request, and returns the access response on which redirection processing is performed to the terminal device, so that the terminal device opens, according the access response, a page that a user needs to access and the redirected-to page of the routing device, thereby resolving a problem in the prior art that, when the routing device redirects a page, the user needs to open another browser window again and enter an address of the page to be accessed so as to reaccess the page that the user needs to access.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Embodiment 1

Figure 1:
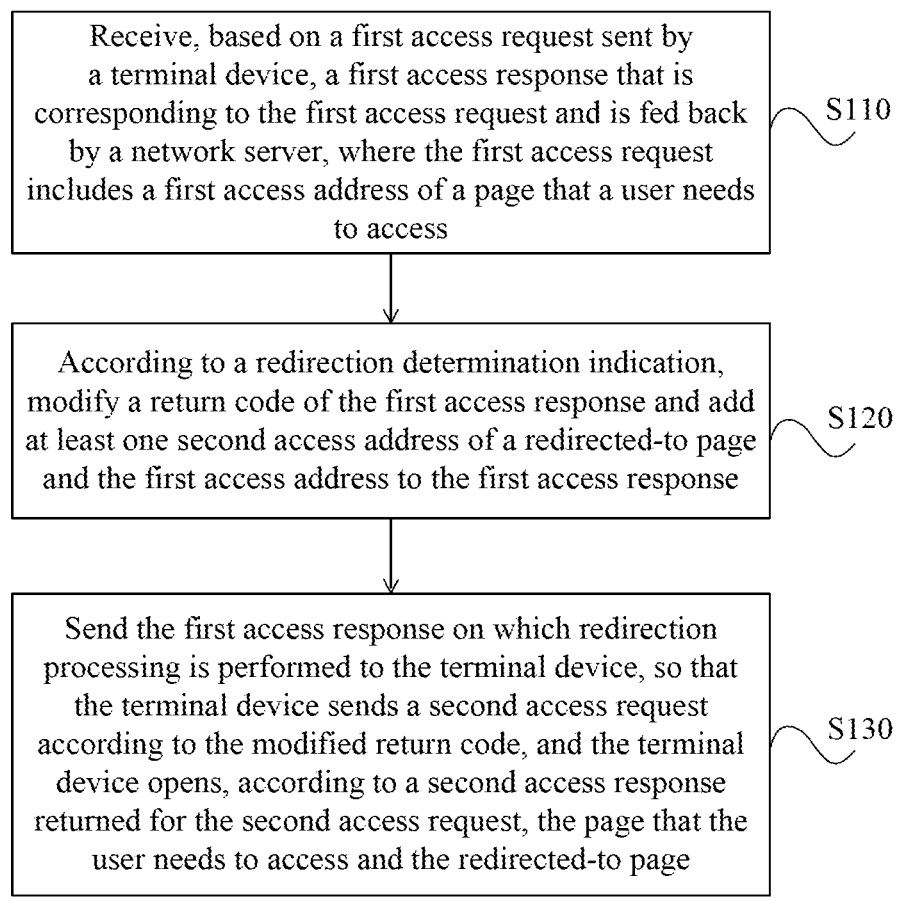
FIG. 1 is a flowchart of a page redirection method according to Embodiment 1 of the present invention.

FIG. 1 is a flowchart of a page redirection method according to Embodiment 1 of the present invention. The method provided by this embodiment is applicable to a terminal device that accesses a network via a routing device, where the routing device needs to perform redirection on a page accessed by a browser of the terminal device to prompt a situation how the routing device completes the configuration request. The method may be executed by a routing device and the device is generally implemented by using hardware and software, and the method may be integrated into a memory of the routing device; for example, be integrated into a processor chip for calling and execution by a processor. As shown in FIG. 1, the method in this embodiment includes the following steps:

S110. Receive, based on a first access request sent by a terminal device, a first access response that is corresponding to the first access request and is fed back by a network server, where the first access request includes a first access address of a page that a user needs to access.

When the user accesses a web page by using a browser, an access request is generally sent to a network server by using the Hypertext Transport Protocol (Hypertext Transport Protocol, HTTP for short). In a network accessed by using the routing device, the access request needs to be forwarded and sent by the routing device. Therefore, in the page redirection method provided by this embodiment, before S110, the routing device first receives the first access request sent by the terminal device and the first access request includes the first access address of the page that the user needs to access, so that the network server feeds back, according to the first access address of the first access request, the first access response corresponding to the first access request.

In specific implementation, the routing device determines to perform redirection processing on the first access request according to a redirection processing rule. The redirection processing rule may be configured in advance on the routing device, and generally a routing device provider may perform uniform configuration for routing devices produced by the routing device provider. For example, hardware and software modules are added to the routing device to preconfigure the redirection processing rule. For example, the redirection processing rule may include: when a version update message notified by the server is detected, setting an access address of a redirected-to page to an access address, in the version update message, of a prompt page. For example, the redirection processing rule is used to, when the routing device detects that an update is available for the current version of the routing device, redirect a page accessed by a user browser to a page for updating the version of the routing device. For another example, the redirection processing rule may further include: when a new short message is detected, setting the access address of the redirected-to page to an access address that is of a prompt page and is notified in the new short message. For example, a universal Subscriber Identity Module (Subscriber Identity Module, SIM for short) may be configured in versions of routing devices, and when it is detected that the SIM receives a new message, the page accessed by the user browser may be redirected to a page used for viewing SIM information in the routing device. Optionally, the foregoing redirection processing rule further includes: canceling the redirection processing rule after performing redirection once. It should be noted that the redirection processing rule in this embodiment may include one or more of the above rules, which is not limited in this embodiment.

Further, the routing device may generally acquire and store the first access address in the first access request according to a redirection determination indication notified by a network server, and meanwhile may send the first access request to the network server corresponding to the first access address, so that the network server feeds back, according to the first access address of the first access request, the first access response corresponding to the first access request, and further the terminal device may acquire, according to the first access response that is corresponding to the first access request and is fed back by the network server, the page that the user needs to access.

Specifically, after receiving the first access request sent by the terminal device, the routing device stores the first access address that is included in the first access request and is of the page that the user needs to access, where the first access address includes uniform resource locator (Uniform Resource Locator, URL for short) information and link information of an access request packet. Generally, the link information and the URL information of the access request packet have a one-to-one mapping relationship, and according to link information, URL information corresponding to the link information can be found. In specific implementation, the URL information includes network address information of the page that the user needs to access, that is, a useful value; the link information includes a key value Key that is in a one-to-one correspondence with the Value, that is, a unique mapping relationship exists between the link information and the URL. Therefore, when receiving an access response, the routing device determines, according to the URL that is included in the access response and is corresponding to the access request, whether the received access response is the access response corresponding to the stored first access address, that is, whether the received access response is the access response corresponding to the first access request.

S120. According to a redirection determination indication, modify a return code of the first access response and add at least one second access address of a redirected-to page and the first access address to the first access response.

The routing device may further perform, according to the redirection determination indication notified by a network server, redirection on the page the terminal device needs to access, so as to complete corresponding configuration. Therefore, content of the first access response is modified, and specifically the return code of the first access response is modified and the at least one second access address of the redirected-to page that is used for the routing device to complete corresponding configuration is added to the first access response. What is different from the prior art is that the first access address recorded when the routing device receives the first access request is added to the access response.

S130. Send the first access response on which redirection processing is performed to the terminal device, so that the terminal device sends a second access request according to the modified return code, and the terminal device opens, according to a second access response returned for the second access request, the page that the user needs to access and the redirected-to page.

In the prior art, because the routing device only adds the access address of the redirected-to page that is used for the routing device to complete the corresponding configuration to the access response fed back by the network server, the user browser can only acquire the redirected-to page according to the access address, and then the browser can only open the redirected-to page that is used for the routing device to complete the corresponding configuration. To open the page that the user needs to access, the user needs to open a browser page again and enter an address the user needs to access. In the page redirection method provided by this embodiment, the routing device sends the modified first access response to the terminal device. What is different from the prior art is that the modified first access response includes the first access address and the at least one second access address, and a user device may acquire, according to the first access address, the page that the user needs to access and acquire the redirected-to page according to the at least one second access address.

In specific implementation, the user terminal device parses a packet when receiving the first access response on which redirection processing is performed. When parsing the packet, the terminal device may identify the modified return code of the first access response and the added access addresses, and then the terminal device automatically resends the second access request according to the modified return code of the first access response, where the resent second access request includes the first access address and the at least one second access address that are added to the fed back first access response. The terminal device may open, at the same time according to the second access response that is returned by the routing device for the second access request, the page that the user needs to access and the redirected-to page used for the routing device to complete the corresponding configuration.

In the page redirection method provided by this embodiment, when receiving an access response corresponding to an access request sent by a terminal device, according to a redirection determination indication, a routing device modifies a return code of the access response and adds, to the access response, at least one second access address of a redirected-to page used for the routing device to complete corresponding configuration and a first access address included in the access request, and returns the access response on which redirection processing is performed to the terminal device, so that the terminal device can open, according to the access response, a page that a user needs to access and the redirected-to page of the routing device, thereby resolving a problem in the prior art that, when the routing device redirects a page, the user needs to open another browser window again and enter an address of the page to be accessed so as to reaccess the page that the user needs to access.

Embodiment 2

Figure 2A:
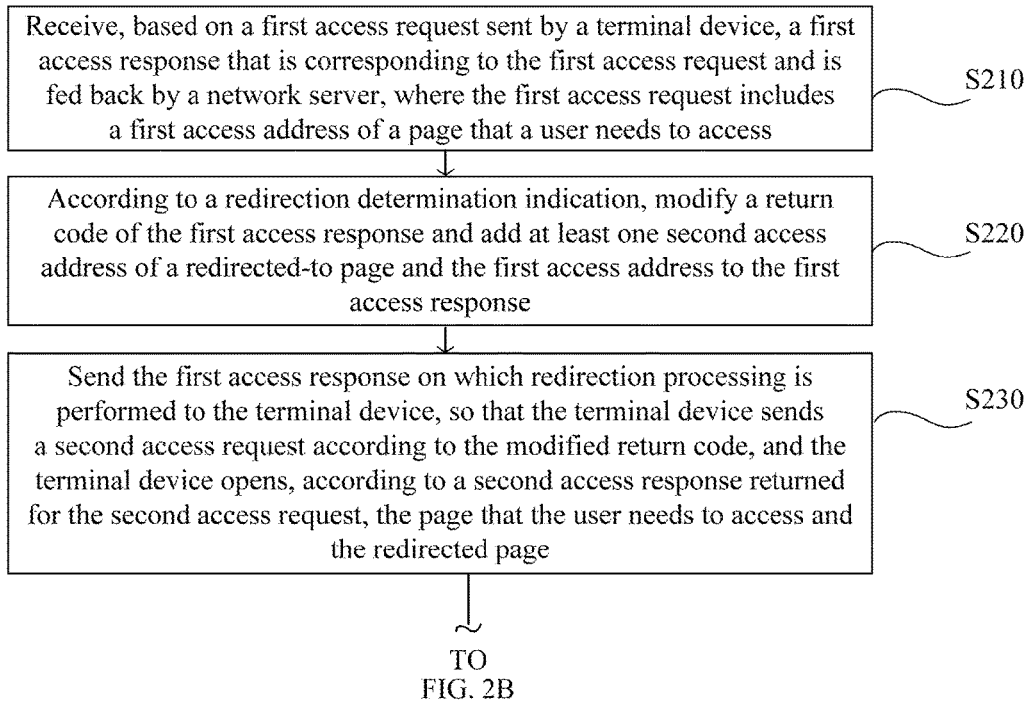
FIG. 2A and FIG. 2B are a flowchart of a page redirection method according to Embodiment 2 of the present invention.
Figure 2B:
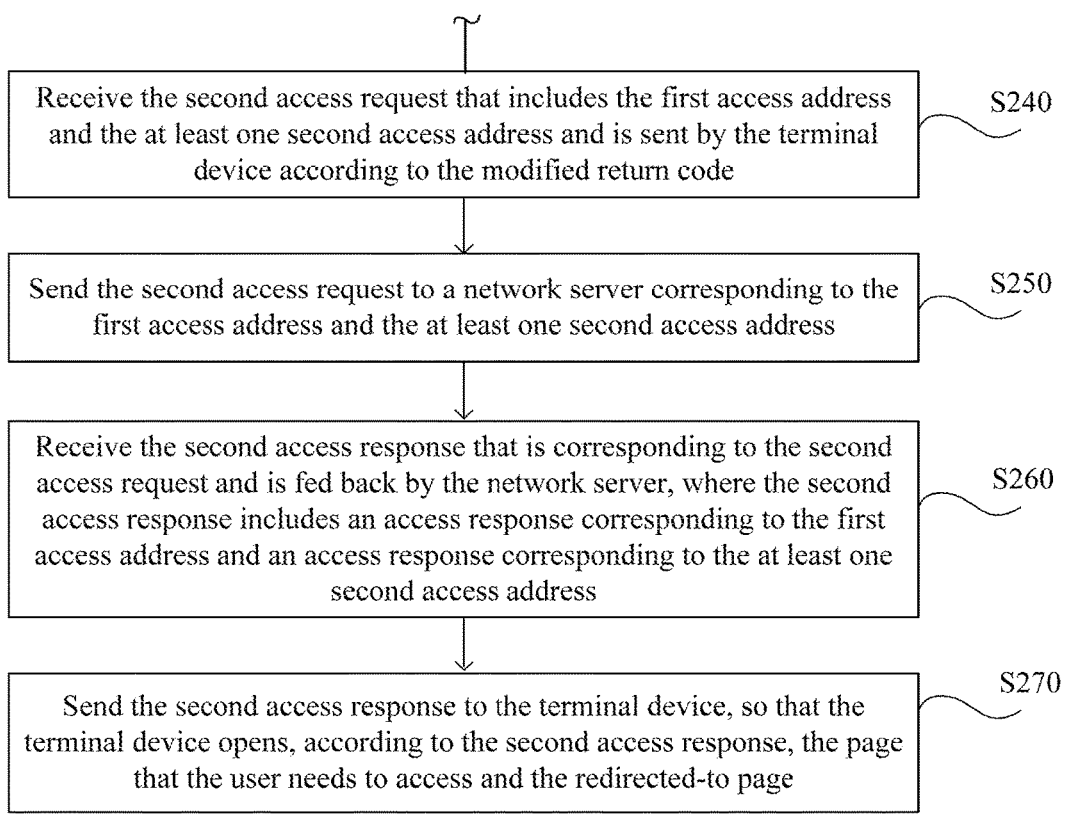

FIG. 2A and FIG. 2B are a flowchart of a page redirection method according to Embodiment 2 of the present invention. As shown in FIG. 2A and FIG. 2B, the method in this embodiment may include:

S210. Receive, based on a first access request sent by a terminal device, a first access response that is corresponding to the first access request and is fed back by a network server, where the first access request includes a first access address of a page that a user needs to access.

S220. According to a redirection determination indication, modify a return code of the first access response and add at least one second access address of a redirected-to page and the first access address to the first access response.

S230. Send the first access response on which redirection processing is performed to the terminal device, so that the terminal device sends a second access request according to the modified return code, and the terminal device opens, according to a second access response returned for the second access request, the page that the user needs to access and the redirected-to page.

Specifically, for specific implementation of S210 to S230, refer to S110 to S130 of Embodiment 1.

S240. Receive the second access request that includes the first access address and the second access address and is sent by the terminal device according to the modified return code.

A manner in which the routing device receives the second access request resent by the terminal device according to the modified return code is the same as a manner for sending the first access request. What is different is that, according to a redirection processing rule, the redirection processing rule is cancelled after performing redirection once, that is, after receiving the second access request sent by the terminal device this time, the redirection processing rule is already canceled, so that it is not necessary to perform an operation of acquiring and storing an access address that is of a page and is included in the second access request.

S250. Send the second access request to a network server corresponding to the first access address and the at least one second access address.

S260. Receive the second access response that is corresponding to the second access request and is fed back by the network server, where the second access response includes an access response corresponding to the first access address and an access response corresponding to the at least one second access address.

S270. Send the second access response to the terminal device, so that the terminal device opens, according to the second access response, the page that the user needs to access and the redirected-to page.

The routing device sends the new second access request to the corresponding network server according to the access address included in the resent second access request. In specific implementation, the routing device may acquire the first access address and the at least one second access address that are included in the received second access request and sends the second access request to the network server corresponding to the foregoing addresses, where a network server only identifies an access address corresponding to the network server itself and feeds back an access response according to the identified access address, so that an access response fed back again by the network server corresponding to the first access address and an access response fed back again by the network server corresponding to the at least one second access address are sent to the user terminal, and the user terminal opens, according to the access response fed back again, the page that the user needs to access and the redirected-to page used for the routing device to complete corresponding configuration.

It should be noted that network servers corresponding to the first access address and the at least one second access address that are included in the second access request sent by the routing device to the network server in S250 may be the same and may also be different. Accordingly, the access response received by the routing device in S260 is corresponding to the foregoing network server.

In the page redirection method provided by this embodiment, when receiving an access response corresponding to an access request sent by a terminal device, according to a redirection determination indication, a routing device modifies a return code of the access response and adds, to the access response, at least one second access address of a redirected-to page used for the routing device to complete corresponding configuration and a first access address included in the access request, and returns the access response on which redirection processing is performed to the terminal device, so that the terminal device can open, according to the access response, a page that a user needs to access and the redirected-to page of the routing device, thereby resolving a problem in the prior art that, when the routing device redirects a page, the user needs to open another browser window again and enter an address of the page to be accessed so as to reaccess the page that the user needs to access. Specifically, the terminal device resends, according to the access response on which redirection processing is performed and that is returned by the routing device, a second access request that includes the first access address and the at least one second access address and then opens, according to a second access response that is returned by the routing device for the second access request, the page that the user needs to access and the redirected-to page used for the routing device to complete corresponding configuration.

Embodiment 3

Figure 3:
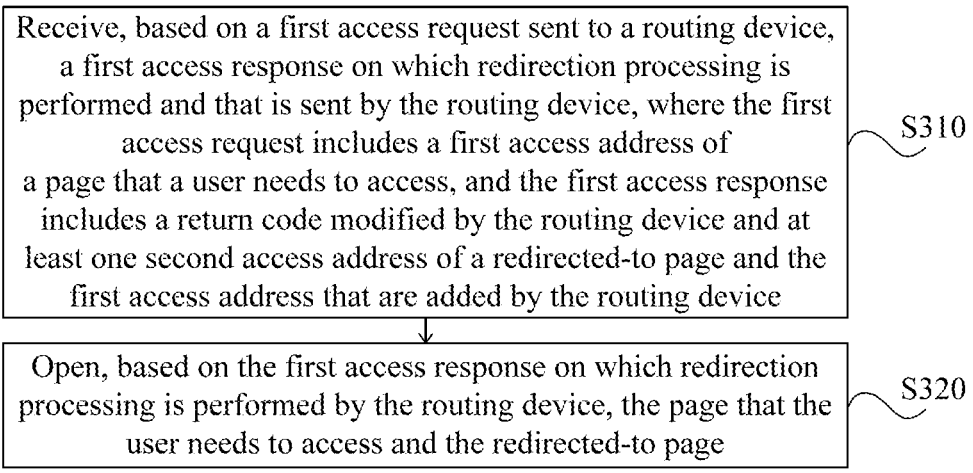
FIG. 3 is a flowchart of a page redirection method according to Embodiment 3 of the present invention.

FIG. 3 is a flowchart of a page redirection method according to Embodiment 3 of the present invention. The method provided by this embodiment is applicable to a terminal device that accesses a network via a routing device, where the routing device needs to perform redirection on a page accessed by a browser of the terminal device to prompt a situation how the routing device completes the configuration request. The method may be executed by a terminal device and the device is generally implemented by using hardware and software, and the method may be integrated into a memory of the terminal device; for example, be integrated into a processor chip for calling and execution by a processor. As shown in FIG. 3, the method in this embodiment includes the following steps:

S310. Receive, based on a first access request sent to a routing device, a first access response on which redirection processing is performed and that is sent by the routing device, where the first access request includes a first access address of a page that a user needs to access, and the first access response includes a return code modified by the routing device and at least one second access address of a redirected-to page and the first access address that are added by the routing device.

When the user accesses, by using the terminal device, the page that the user needs to access, an access request is generally sent to a network server by using the HTTP protocol. In a network accessed by using the routing device, the first access request sent by the terminal device needs to be forwarded to the network server by using the routing device, where the first access request includes the first access address of the page that the user needs to access, so that the routing device forwards the access request to the network server corresponding to the first access address.

The page redirection method provided by this embodiment, before S310, further includes: sending the first access request that includes the foregoing first access address to the routing device, so that the routing device acquires and stores the first access address in the first access request, and the routing device sends the first access request to the network server corresponding to the first access address. After receiving the first access request, the network server feeds back the first access response corresponding to the first access request. In a forwarding process by using the routing device, the routing device performs redirection processing on the first access response, and therefore the first access response that is forwarded by the routing device and is received by the terminal device includes not only the first access address of the page the user terminal device needs to access but also the at least one second access address of the redirected-to page used for the routing device to complete corresponding configuration.

S320. Open, based on the first access response on which redirection processing is performed by the routing device, the page that the user needs to access and the redirected-to page.

The terminal device receives the first access response on which redirection processing is performed by the routing device. What is different from the prior art is that the first access response after the redirection processing includes the first access address and the at least one second access address, and a user browser of the terminal device may open, according to the first access address, the page that the user needs to access and open the redirected-to page according to the at least one second access address. In specific implementation, the user terminal device parses a packet when receiving the first access response. When parsing the packet, the terminal device may identify the modified return code of the first access response and the added access addresses, and then the terminal device automatically resends a second access request according to the modified return code of the first access response, where the resent second access request includes the first access address and at least one second access address that are added to the fed back first access response, and further the terminal device opens, at the same time according to the second access response that is returned by the routing device for the second access request, the page that the user needs to access and the redirected-to page used for the routing device to complete the corresponding configuration.

In the page redirection method provided by this embodiment, a terminal device receives an access response on which redirection processing is performed and that is returned by a routing device, where the redirection processing on the access response is that: when page redirection is required, a return code of the received access response is modified and at least one second access address of a redirected-to page used to complete corresponding configuration and a first access address included in the an access request are added to the access response. Therefore, the terminal device opens, according to the received access response on which redirection processing is performed, a page that a user needs to access and the redirected-to page of the routing device, thereby resolving a problem in the prior art that, when the routing device redirects a page, the user needs to open another browser window again and enter an address of the page to be accessed so as to reaccess the page that the user needs to access.

Embodiment 4

Figure 4:
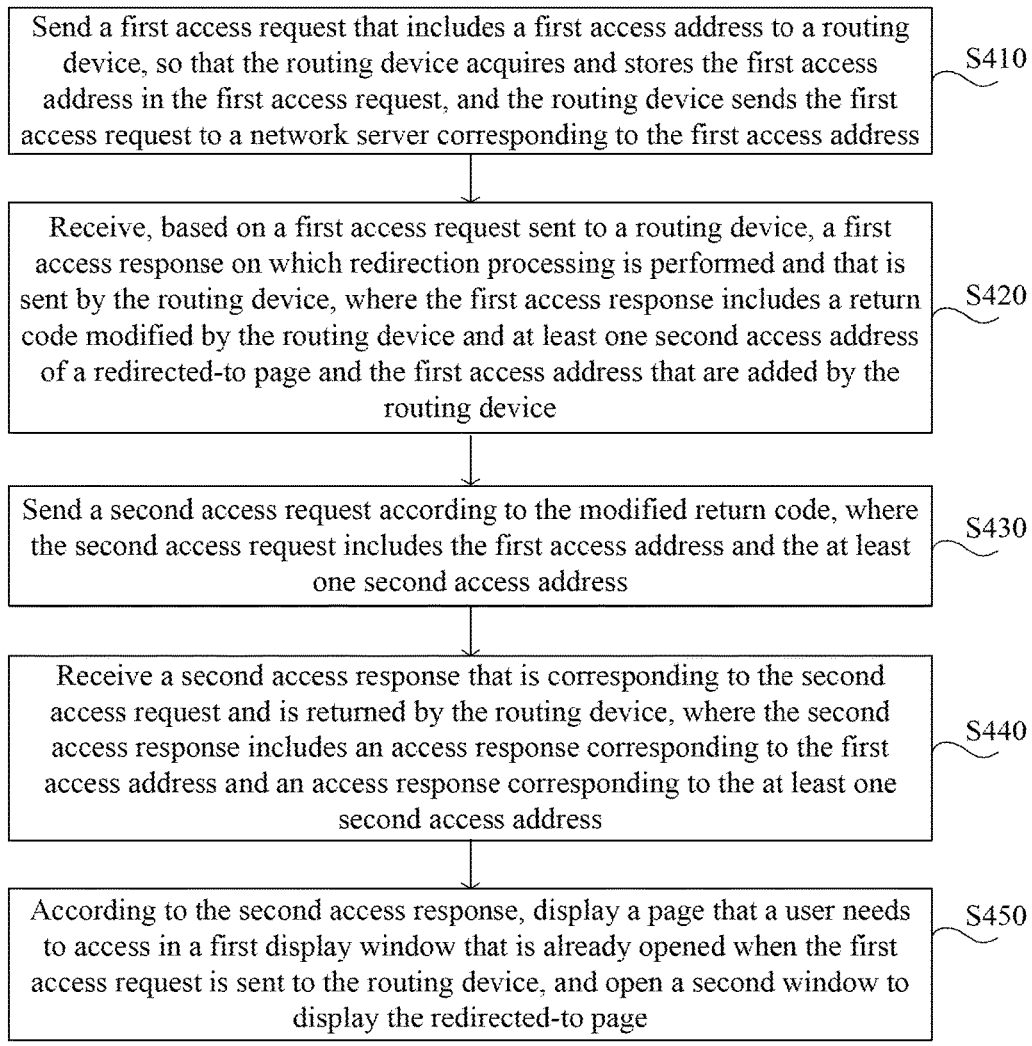
FIG. 4 is a flowchart of a page redirection method according to Embodiment 4 of the present invention.

FIG. 4 is a flowchart of a page redirection method according to Embodiment 4 of the present invention. As shown in FIG. 4, the method in this embodiment may include:

S410. Send a first access request that includes a first access address to a routing device, so that the routing device acquires and stores the first access address in the first access request, and the routing device sends the first access request to a network server corresponding to the first access address.

S420. Receive, based on the first access request sent to the routing device, a first access response on which redirection processing is performed and that is sent by the routing device, where the first access response includes a return code modified by the routing device and at least one second access address of a redirected-to page and the first access address that are added by the routing device.

S430. Send a second access request according to the modified return code, where the second access request includes the first access address and the at least one second access address.

A terminal device determines, according to the modified return code, that the received first access response is an access response on which redirection processing is performed. Only when the routing device needs to perform redirection processing on a page accessed by a browser of the terminal device will the routing device modify the return code of the first access response and add the at least one second access address of the redirected-to page for which the routing device has completed corresponding configuration and the first access address. Therefore, the terminal device determines, according to the modified return code of the first access response, that the first access response is the access response on which redirection processing is performed by the routing device, and further it is necessary to resend the second access request according to the modified return code and the access address added to the first access response, where an address included in the second access request is the address added to the first access response on which redirection processing is performed, that is, the first access address a user needs to access and the at least one second access address of the redirected-to page used for the routing device to complete the corresponding configuration.

S440. Receive a second access response that is corresponding to the second access request and is returned by the routing device, where the second access response includes an access response corresponding to the first access address and an access response corresponding to the at least one second access address.

The routing device separately sends, according to the second access request resent by the terminal device, the new second access request to network servers corresponding to the first access address and the second access address and feeds back, to the user terminal device, an access response fed back again by a network server corresponding to the first access address and an access response fed back by a network server corresponding to the second access address.

It should be noted that the second access response that is returned by the routing device and is received by the terminal device in S440 may be returned by one network device, and may also be returned by two network servers, and the network servers that return the access response are corresponding to the first access address and the at least one second access address that are included in the resent second access request.

S450. According to the second access response, display a page that a user needs to access in a first display window that is already opened when the first access request is sent to the routing device, and open a second display window to display the redirected-to page.

In the page redirection method provided by this embodiment, a terminal device receives an access response on which redirection processing is performed and that is returned by a routing device, where the redirection processing on the access response is that: when page redirection is required, a return code of the received access response is modified and at least one second access address of a redirected-to page used to complete corresponding configuration and a first access address included in the an access request are added to the access response. Therefore, the terminal device opens, according to the received access response on which redirection processing is performed, a page that a user needs to access and the redirected-to page of the routing device, thereby resolving a problem in the prior art that, when the routing device redirects a page, the user needs to open another browser window again and enter an address of the page to be accessed so as to reaccess the page that the user needs to access. Specifically, the terminal device resends, according to the access response on which redirection processing is performed and that is returned by the routing device, a second access request that includes the first access address and the at least one second access address and then opens, according to a second access response that is returned by the routing device for the second access request, the page that the user needs to access and the redirected-to page used for the routing device to complete corresponding configuration.

Embodiment 5

Figure 5:
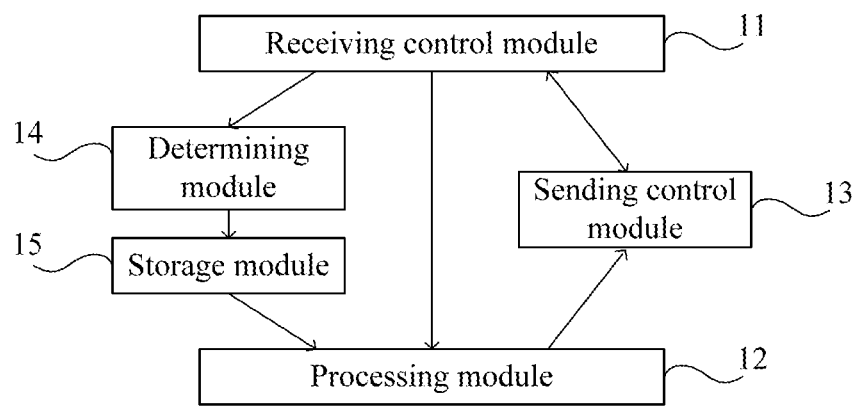
FIG. 5 is a schematic structural diagram of a routing device according to Embodiment 5 of the present invention.

FIG. 5 is a schematic structural diagram of a routing device according to Embodiment 5 of the present invention. As shown in FIG. 5, the routing device provided by this embodiment specifically includes that a receiving control module 11, a processing module 12 and a sending control module 13.

The receiving control module 11 is configured to receive, based on a first access request sent by a terminal device and by controlling a receiver, a first access response that is corresponding to the first access request and is fed back by a network server, where the first access request includes a first access address of a page that a user needs to access.

The processing module 12 is configured to: according to a redirection determination indication, modify a return code of the first access response received by the receiving control module 11 and add at least one second access address of a redirected-to page and the first access address to the first access response.

The sending control module 13 is configured to send, by controlling a transmitter, the first access response on which redirection processing is performed by the processing module 12 to the terminal device, so that the terminal device sends a second access request according to the modified return code, and the terminal device opens, according to a second access response returned for the second access request, the page that the user needs to access and the redirected-to page.

Further, according to the routing device provided by this embodiment, the receiving control module 11 is further configured to: before receiving, by controlling the receiver, the first access response that is corresponding to the first access request and is fed back by the network server, receive, by controlling the receiver, the first access request sent by the terminal device. The routing device provided by this embodiment further includes: a determining module 14, configured to determine to perform redirection processing on the first access request according to a redirection processing rule; and a storage module 15, configured to acquire and store the first access address in the first access request according to the redirection determination indication. For example, the redirection processing rule includes: when a version update message notified by a server is detected, setting an access address of the redirected-to page to an access address, in the version update message, of a prompt page. For another example, the redirection processing rule further includes: when a new short message is detected, setting the access address of the redirected-to page to an access address that is of a prompt page and is notified in the new short message. Optionally, the foregoing redirection processing rule further includes: canceling the redirection processing rule after performing redirection once. It should be noted that the redirection processing rule in this embodiment may include one or more of the above rules, which is not limited in this embodiment.

Still further, the sending control module 13 is further configured to send, by controlling the transmitter, the first access request to the network server corresponding to the first access address.

The routing device provided by this embodiment of the present invention is configured to execute the page redirection method provided by Embodiment 1 of the present invention, and has corresponding function modules. The implementation principle and technical effect are similar, and details are not repeatedly described herein.

Embodiment 6

Referring to FIG. 5, FIG. 5 is also a schematic structural diagram of a routing device according to Embodiment 6 of the present invention. A structure of the routing device in this embodiment is the same as a structure of the routing device provided by Embodiment 5, but module functions are different. In this embodiment:

the receiving control module 11 is further configured to: after the sending control module 13 sends, by controlling the transmitter, the first access response on which redirection processing is performed by the processing module 12 to the terminal device so that the terminal device sends the second access request according to the modified return code, receive, by controlling the receiver, the second access request that includes the first access address and the at least one second access address and is sent by the terminal device according to the modified return code;

the sending control module 13 is further configured to send, by controlling the transmitter, the second access request that is received by the receiving control module 11 to a network server corresponding to the first access address and the at least one second access address;

the receiving control module 11 is further configured to receive, by controlling the receiver, the second access response that is corresponding to the second access request and is fed back by the network server, where the second access response includes an access response corresponding to the first access address and an access response corresponding to the at least one second access address; and the sending control module 13 is further configured to send, by controlling the transmitter, the second access response received by the receiving control module 11 to the terminal device, so that the terminal device opens, according to the second access response, the page that the user needs to access and the redirected-to page.

The routing device provided by this embodiment of the present invention is configured to execute the page redirection method provided by Embodiment 1 of the present invention, and has corresponding function modules. The implementation principle and technical effect are similar, and details are not repeatedly described herein.

Embodiment 7

Figure 6:
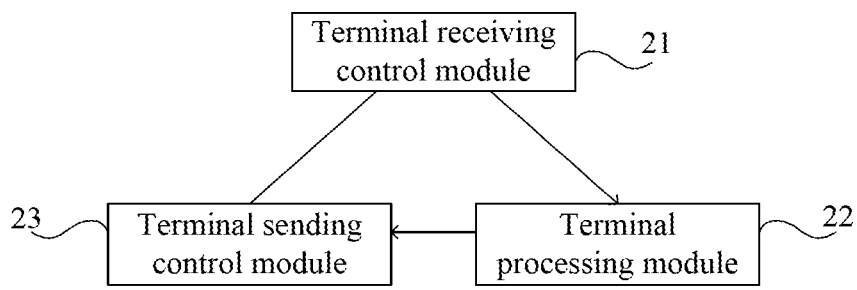
FIG. 6 is a schematic structural diagram of a terminal device according to Embodiment 7 of the present invention.

FIG. 6 is a schematic structural diagram of a terminal device according to Embodiment 7 of the present invention. As shown in FIG. 6, the terminal device provided by this embodiment specifically includes: a terminal receiving control module 21 and a terminal processing module 22.

The terminal receiving control module 21 is configured to receive, based on a first access request sent to a routing device and by controlling a terminal receiver, a first access response on which redirection processing is performed and that is sent by the routing device, where the first access request includes a first access address of a page that a user needs to access, and the first access response includes a return code modified by the routing device and at least one second access address of a redirected-to page and the first access address that are added by the routing device.

The terminal processing module 22 is configured to: based on the first access response on which redirection processing is performed by the routing device, open the page that the user needs to access and the redirected-to page.

The terminal device provided by this embodiment further includes: a terminal sending control module 23, configured to: before the terminal receiving control module 21 receives the first access response on which redirection processing is performed and that is sent by the routing device, send, by controlling a terminal transmitter, the first access request to the routing device, so that the routing device acquires and stores the first access address in the first access request, and the routing device sends the first access request to a network server corresponding to the first access address.

The terminal device provided by this embodiment of the present invention is configured to execute the page redirection method provided by Embodiment 3 of the present invention, and has corresponding function modules. The implementation principle and technical effect are similar, and details are not repeatedly described herein.

Embodiment 8

Referring to FIG. 6, FIG. 6 is also a schematic structural diagram of a routing device according to Embodiment 8 of the present invention. A structure of the terminal device in this embodiment is the same as a structure of the routing device provided by Embodiment 7, but module functions are different. In this embodiment:

the terminal sending control module 23 is further configured to: before the terminal processing module 22 opens the page that the user needs to access and the redirected-to page, send a second access request according to the modified return code by controlling the terminal transmitter, where the second access request includes the first access address and the at least one second access address;

the terminal receiving control module 21 is further configured to receive, by controlling the terminal receiver, a second access response that is corresponding to the second access request and is returned by the routing device, where the second access response includes an access response corresponding to the first access address and an access response corresponding to the at least one second access address; and the terminal processing module 22 is specifically configured to: according to the second access response received by the terminal receiving control module 21, display the page that the user needs to access in a first display window that is already opened when the first access request is sent to the routing device and open a second window to display the redirected-to page.

The terminal device provided by this embodiment of the present invention is configured to execute the page redirection method provided by Embodiment 4 of the present invention, and has corresponding function modules. The implementation principle and technical effect are similar, and details are not repeatedly described herein.

Embodiment 9

Figure 7:
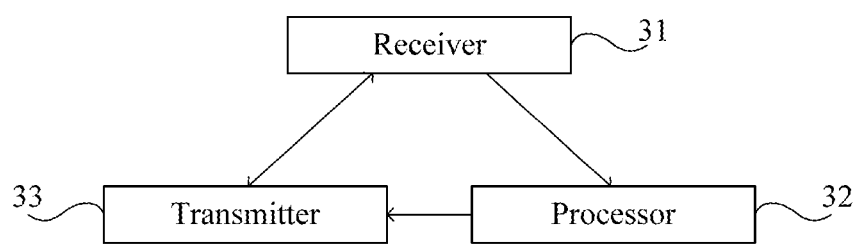
FIG. 7 is a schematic structural diagram of a routing device according to Embodiment 9 of the present invention.

FIG. 7 is a schematic structural diagram of a routing device according to Embodiment 9 of the present invention. As shown in FIG. 7, the routing device provided by this embodiment specifically includes: a receiver 31, a processor 32 and a transmitter 33.

The receiver 31 is configured to receive, based on a first access request sent by a terminal device, a first access response that is corresponding to the first access request and is fed back by a network server, where the first access request includes a first access address of a page that a user needs to access.

The processor 32 is configured to: according to a redirection determination indication, modify a return code of the first access response received by the receiver 31 and add at least one second access address of a redirected-to page and the first access address to the first access response.

The transmitter 33 is configured to send the first access response on which redirection processing is performed by the processor 32 to the terminal device, so that the terminal device sends a second access request according to the modified return code, and the terminal device opens, according to a second access response returned for the second access request, the page that the user needs to access and the redirected-to page.

Further, according to the routing device provided by this embodiment, the receiver 31 is further configured to: before receiving the first access response that is corresponding to the first access request and is fed back by the routing device, receive the first access request sent by the terminal device; the processor 32 is further configured to determine, according to a redirection processing rule, to perform redirection processing on the first access request and acquires and stores the first access address in the first access request according to the redirection determination indication. For example, the redirection processing rule includes: when a version update message notified by a server is detected, setting an access address of the redirected-to page to an access address, in the version update message, of a prompt page. For another example, the redirection processing rule further includes: when a new short message is detected, setting the access address of the redirected-to page to an access address that is of a prompt page and is notified in the new short message. Optionally, the foregoing redirection processing rule further includes: canceling the redirection processing rule after performing redirection once. It should be noted that the redirection processing rule in this embodiment may include one or more of the above rules, which is not limited in this embodiment.

Still further, the transmitter 33 is further configured to send the first access request to the network server corresponding to the first access address.

The routing device provided by this embodiment of the present invention is configured to execute the page redirection method provided by Embodiment 1 of the present invention, and has corresponding entity apparatuses. The implementation principle and technical effect are similar, and details are not repeatedly described herein.

Optionally, based on the device structure provided by the foregoing Embodiment 9, the receiver 31 is further configured to: after the transmitter 33 sends the first access response on which redirection processing is performed by the processor 32 to the terminal device so that the terminal device sends the second access request according to the modified return code, receive the second access request that includes the first access address and the at least one second access address and is sent by the terminal device according to the modified return code.

The transmitter 33 is further configured to separately send the second access request received by the receiver 31 to network servers corresponding to the first access address and the at least one second access address.

The receiver 31 is further configured to receive the second access response that is corresponding to the second access request and is fed back by the network servers, where the second access response includes an access response corresponding to the first access address and an access response corresponding to the at least one second access address.

The transmitter 33 is further configured to send the second access response received by the receiver 31 to the terminal device, so that the terminal device opens, according to the second access response, the page that the user needs to access and the redirected-to page.

The routing device provided by this embodiment of the present invention is configured to execute the page redirection method provided by Embodiment 2 of the present invention, and has corresponding entity apparatuses. The implementation principle and technical effect are similar, and details are not repeatedly described herein.

Embodiment 10

Figure 8:
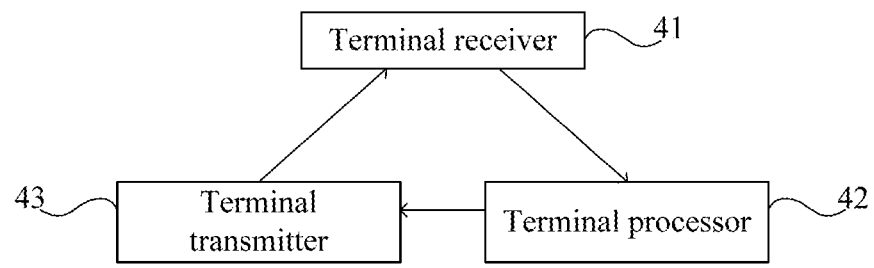
FIG. 8 is a schematic structural diagram of a terminal device according to Embodiment 10 of the present invention.

FIG. 8 is a schematic structural diagram of a terminal device according to Embodiment 10 of the present invention. As shown in FIG. 8, the terminal device provided by this embodiment specifically includes: a terminal receiver module 41 and a terminal processor 42.

The terminal receiver 41 is configured to receive, based on a first access request sent to a routing device, a first access response on which redirection processing is performed and that is sent by the routing device, where the first access request includes a first access address of a page that a user needs to access, and the first access response includes a return code modified by the routing device and at least one second access address of a redirected-to page and the first access address that are added by the routing device.

The terminal processor 42 is configured to: based on the first access response on which redirection processing is performed by the routing device, open the page that the user needs to access and the redirected-to page.

The terminal device provided by this embodiment further includes: a terminal transmitter 43, configured to: before the terminal receiver 41 receives the first access response on which redirection processing is performed and that is sent by the routing device, send the first access request to the routing device, so that the routing device acquires and stores the first access address in the first access request, and the routing device sends the first access request to a network server corresponding to the first access address.

The terminal device provided by this embodiment of the present invention is configured to execute the page redirection method provided by Embodiment 3 of the present invention, and has corresponding entity apparatuses. The implementation principle and technical effect are similar, and details are not repeatedly described herein.

Further, according to the terminal devices provided by this embodiment, the terminal transmitter 43 is further configured to: before the terminal processor 42 opens the page that the user needs to access and the redirected-to page, send a second access request according to the modified return code, where the second access request includes the first access address and the at least one second access address.

The terminal receiver 41 is further configured to receive a second access response corresponding to the second access request returned by the routing device, where the second access response includes an access response corresponding to the first access address and an access response corresponding to the at least one second access address.

The terminal processor 42 is specifically configured to: according to the second access response received by the terminal receiver 41, display the page that the user needs to access in a first display window that is already opened when the first access request is sent to the routing device, and open a second window to display the redirected-to page.

The terminal device provided by this embodiment of the present invention is configured to execute the page redirection method provided by Embodiment 4 of the present invention, and has corresponding entity apparatuses. The implementation principle and technical effect are similar, and details are not repeatedly described herein.

This embodiment provides a page redirection system, and the system may include a routing device and a terminal device.

The routing device includes a receiving control module, a processing module, a sending control module, a determining module and a storage module. For specific content, refer to the receiving control module 11, the processing module 12, the sending control module 13, the determining module 14 and the storage module 15 of the routing device of the foregoing embodiment, and details are not repeatedly described herein.

The terminal device includes a terminal receiving control module, a terminal processing module and a terminal sending control module. For specific content, refer to the terminal receiving control module 21, the terminal processing module 22 and the terminal sending control module 23 of the terminal device of the foregoing embodiment, and details are not repeatedly described herein.

Persons of ordinary skill in the art may understand that all or some of the steps of the method embodiments may be implemented by a program instructing relevant hardware. The foregoing program may be stored in a readable storage medium of a terminal device or a routing device. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, rather than to limit the present invention. Although the present invention is described in detail with reference to the foregoing embodiments, persons of ordinary skill in the art should understand that they can still make modifications to the technical solutions recorded in the foregoing embodiments, or make equivalent substitutions to part or all of the technical features of the technical solutions; however, these modifications or substitutions do not make the essence of the corresponding technical solutions depart from the scope of the technical solutions of the embodiments of the present invention.

What is claimed is:

1. A page redirection method, comprising:
receiving, by a routing device, based on a first access request sent by a terminal device, a first access response corresponding to the first access request from a network server, wherein the first access request comprises a first access address of a page that a user needs to access;
when an update is available for a configuration of the routing device, modifying, by the routing device, a return code of the first access response and adding, by the routing device, a second access address of a redirected-to page and the first access address to the first access response, wherein the second access address of the redirected-to page is an access address to a page to update the configuration of the routing device; and
sending, by the routing device, the first access response that includes the return code that is modified, and the second access address of the redirected-to page to the terminal device, wherein the first access response prompts the terminal device to send a second access request according to the return code that is modified, and to open the page that the user needs to access and the redirected-to page upon receiving a second access response returned for the second access request.

2. The method according to claim 1, before receiving the first access response, further comprising:
receiving, by the routing device, the first access request sent by the terminal device;
acquiring and storing, by the routing device, the first access address in the first access request when the update is available for the configuration of the routing device; and
sending, by the routing device, the first access request to the network server corresponding to the first access address.

3. The method according to claim 2, before acquiring and storing the first access address in the first access request, further comprising:
determining to perform redirection processing on the first access request according to a redirection processing rule, when a version update message notified by the network server is detected, wherein the version update message comprises an access address of a prompt page to update the configuration of the routing device; and
performing the redirection processing by setting the second access address of the redirected-to page to the access address of the prompt page.

4. The method according to claim 3, wherein the redirection processing rule further comprises:
canceling, by the routing device, the redirection processing rule after performing the redirection processing once.

5. The method according to claim 2, before acquiring and storing the first access address in the first access request, further comprising:
determining to perform redirection processing on the first access request according to a redirection processing rule, when a new short message is detected; and
performing the redirection processing by setting, by the routing device, the second access address of the redirected-to page to an access address that is of a prompt page that is notified in the new short message.

6. The method according to claim 5, wherein the redirection processing rule further comprises:
canceling, by the routing device, the redirection processing rule after performing the redirection processing once.

7. The method according to claim 1, after sending the first access response, further comprising:
receiving, by the routing device, the second access request that is sent by the terminal device according to the return code that is modified, wherein the second access request comprises the first access address and the second access address;
sending, by the routing device, the second access request to the network server corresponding to the first access address and the second access address;
receiving, by the routing device, the second access response that is corresponding to the second access request and is fed back by the network server, wherein the second access response comprises an access response corresponding to the first access address and an access response corresponding to the second access address; and
sending, by the routing device, the second access response to the terminal device, wherein the terminal device opens, according to the second access response, the page that the user needs to access and the redirected-to page.

8. A page redirection method comprising:
receiving, by a terminal device, based on a first access request sent to a routing device, a first access response sent by the routing device according to a redirection processing that is performed by the routing device when an update is available for a configuration of the routing device, wherein the first access request comprises a first access address of a page that a user needs to access, and the first access response comprises the first access address of the page that the user needs to access, a return code modified by the routing device, and a second access address of a redirected-to page, and wherein the second access address of the redirected-to page is an access address to a page to update the configuration of the routing device; and
sending, by the terminal device, a second access request according to the return code that is modified in response to receiving the first access response that includes the first access address and the second access address of the redirected-to page;
receiving, by the terminal device, a second access response in response to the second access request; and
opening, by the terminal device, based on the first access response and the second access response, both the page that the user needs to access and the redirected-to page.

9. The method according to claim 8, before receiving the first access response, further comprising:
sending, by the terminal device, the first access request to the routing device, wherein the first access address in the first access request can be acquired and stored by the routing device, and the first access request can be sent by the routing device to a network server corresponding to the first access address.

10. The method according to claim 8, wherein opening both the page that the user needs to access and the redirected-to page comprises:
according to the second access response, displaying the page that the user needs to access in a first display window that is already opened when the first access request is sent to the routing device, and opening a second window to display the redirected-to page.

11. A routing device comprising a processor and a non-transitory computer-readable medium storing programming for execution by the processor, the programming including instructions to:
- receive, based on a first access request sent by a terminal device, a first access response corresponding to the first access request from a network server, wherein the first access request comprises a first access address of a page that a user needs to access;
- when an update is available for a configuration of the routing device, perform a redirection processing on the first access request;
- wherein the instructions to perform the redirection processing comprise instructions to:
  - modify a return code of the first access response, and add a second access address of a redirected-to page and the first access address to the first access response, wherein the second access address of the redirected-to page is an access address to a page to update the configuration of the routing device; and
  - send the first access response that includes the return code that is modified, and the second access address of the redirected-to page to the terminal device, wherein the first access response prompts the terminal device to send a second access request according to the return code that is modified, and to open both the page that the user needs to access and the redirected-to page upon receiving a second access response returned for the second access request.

12. The routing device according to claim 11, wherein before the instructions to receive the first access response, the programming further includes instructions to:
- receive the first access request sent by the terminal device;
- acquire and store the first access address in the first access request when the update is available for the configuration of the routing device; and
- send the first access request to the network server corresponding to the first access address.

13. The routing device according to claim 12, wherein before the instructions to acquire and store the first access address in the first access request, the programming further includes instructions to:
- determine to perform the redirection processing on the first access request according to a redirection processing rule, when a version update message notified by the network server is detected, wherein the version update message comprises an access address of a prompt page to update the configuration of the routing device; and
- wherein the instructions to perform the redirection processing further comprise instructions to set the second access address of the redirected-to page to the access address of the prompt page.

14. The routing device according to claim 13, wherein the programming further comprises instructions to cancel the redirection processing rule after performing the redirection processing once.

15. The routing device according to claim 12, before the instructions to acquire and store the first access address in the first access request, the programming further includes instructions to:
- determine to perform the redirection processing on the first access request according to a redirection processing rule, when a new short message is detected; and
- wherein the instructions to perform the redirection processing further comprise instructions to set the second access address of the redirected-to page to an access address that is of a prompt page that is notified in the new short message.

16. The routing device according to claim 15, wherein the programming further comprises instructions to cancel the redirection processing rule after performing the redirection processing once.

17. The routing device according to claim 11, wherein after the instructions to send the first access response, the programming further includes instructions to:
- receive the second access request that is sent by the terminal device according to the return code that is modified, wherein the second access request comprises the first access address and the second access address;
- send the second access request to the network server corresponding to the first access address and the second access address;
- receive the second access response that is corresponding to the second access request and is fed back by the network server, wherein the second access response comprises an access response corresponding to the first access address and an access response corresponding to the second access address; and
- send the second access response to the terminal device, wherein the terminal device opens, according to the second access response, the page that the user needs to access and the redirected-to page.

* * * * *